(12) United States Patent
Wang et al.

(10) Patent No.: US 11,376,776 B2
(45) Date of Patent: Jul. 5, 2022

(54) METHOD OF MEASURING TRUE SHEAR VISCOSITY PROFILE OF MOLDING MATERIAL IN CAPILLARY AND MOLDING SYSTEM PERFORMING THE SAME

(71) Applicant: CORETECH SYSTEM CO., LTD., Zhubei (TW)

(72) Inventors: Chen-Chieh Wang, Zhubei (TW); Yu-Ho Wen, Zhubei (TW); Guo-Sian Cyue, Zhubei (TW); Chih-Chung Hsu, Zhubei (TW); Chia-Hsiang Hsu, Zhubei (TW); Rong-Yeu Chang, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/381,881

(22) Filed: Jul. 21, 2021

(65) Prior Publication Data

US 2022/0063166 A1 Mar. 3, 2022

Related U.S. Application Data

(60) Provisional application No. 63/070,566, filed on Aug. 26, 2020.

(51) Int. Cl.
*B29C 45/76* (2006.01)
*B29C 45/78* (2006.01)
(Continued)

(52) U.S. Cl.
CPC .......... *B29C 45/7646* (2013.01); *B29C 45/77* (2013.01); *B29C 45/78* (2013.01);
(Continued)

(58) Field of Classification Search
CPC ..... B29C 45/7646; B29C 45/77; B29C 45/78; B29C 2045/0098; B29C 2945/76006;
(Continued)

(56) References Cited

U.S. PATENT DOCUMENTS

| 6,177,190 | B1 * | 1/2001 | Gehlsen | ................. C09J 123/20 522/158 |
| 2011/0269359 | A1 * | 11/2011 | Tam | ...................... B29C 48/832 428/375 |
| 2021/0154916 | A1 * | 5/2021 | Kazmer | ................ B29C 64/118 |

OTHER PUBLICATIONS

Ramesh Kumar Selvasankar, Rheological characterisation of polymer melts on an injection moulding machine using a new slit die measurement system, Sep. 23, 2008, master thesis of Institute of Plastics Processing of Univerisity of Leobon, Austria (95 pages).
(Continued)

*Primary Examiner* — Matthew J Daniels
*Assistant Examiner* — Gregory C. Grosso
(74) *Attorney, Agent, or Firm* — Muncy, Geissler, Olds & Lowe, P.C.

(57) ABSTRACT

The present disclosure provides a method of measuring a true shear viscosity profile of a molding material in a capillary and a molding system performing the same. The method includes the operations of: determining a setpoint temperature of the molding material before injecting into the capillary; obtaining an initial shear viscosity profile at the setpoint temperature with respect to a shear rate of the molding material; fitting an initial temperature profile with respect to the shear rate according to the initial shear viscosity based on Cross William-Landel-Ferry model; fitting a first shear viscosity profile and a first temperature profile with respect to the shear rate according to the initial temperature profile based on the Cross-WLF model; and setting the first shear viscosity profile as the true shear viscosity profile when a difference between the first tem-
(Continued)

perature profile and the initial temperature profile is not greater than a threshold.

13 Claims, 10 Drawing Sheets

(51) Int. Cl.
    *B29C 45/77* (2006.01)
    *G05B 19/18* (2006.01)
    *B29C 45/00* (2006.01)

(52) U.S. Cl.
    CPC ...... *G05B 19/18* (2013.01); *B29C 2045/0098* (2013.01); *B29C 2945/7604* (2013.01); *B29C 2945/7605* (2013.01); *B29C 2945/76006* (2013.01); *B29C 2945/76056* (2013.01); *B29C 2945/76481* (2013.01); *B29C 2945/76946* (2013.01); *G05B 2219/45244* (2013.01)

(58) Field of Classification Search
    CPC .... B29C 2945/7604; B29C 2945/7605; B29C 2945/76056; B29C 2945/76481; B29C 2945/76946
    USPC .......................................................... 700/200
    See application file for complete search history.

(56) References Cited

OTHER PUBLICATIONS

Walter Friesenbichler, Andreas Neunhauserer, and Ivica Duretek, Rheometry of polymer melts using processing machines, Koera-Australia Rheology Journal, 28(3), 167-174, Aug. 2016, Austria (8 pages).

* cited by examiner

METHOD OF MEASURING TRUE SHEAR VISCOSITY PROFILE OF MOLDING MATERIAL IN CAPILLARY AND MOLDING SYSTEM PERFORMING THE SAME

CROSS-REFERENCE TO RELATED APPLICATIONS

This application claims the benefit of prior-filed provisional application with application Ser. No. 63/070,566, filed Aug. 26, 2020, which is incorporated by reference in its entirety.

TECHNICAL FIELD

The present disclosure relates to a measurement method, and more particularly, to a method of measuring the shear viscosity.

DISCUSSION OF THE BACKGROUND

In injection molding process, the flow behavior of a molding material in the capillary is simulated based on several assumptions, such as constant melt temperature, Weissenberg-Rabinowitsch correction, and generalized Newtonian fluids without viscoelasticity. However, these assumptions are inappropriate in some situations. For example, when the molding material has a temperature change, the flow behavior of the molding material will be simulated inaccurately. Consequently, the result of the injection molding will deviate from the simulation which makes the injection molding process inefficient. Therefore, the accuracy of the simulation of the molding material has become a critical issue in this field.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method of measuring a true shear viscosity profile of a molding material in a capillary. The method includes the operations of: determining a setpoint temperature of the molding material before injecting into the capillary; obtaining an initial shear viscosity profile at the setpoint temperature with respect to a shear rate of the molding material; fitting an initial temperature profile with respect to the shear rate according to the initial shear viscosity based on a Cross William-Landel-Ferry (Cross-WLF) model; fitting a first shear viscosity profile and a first temperature profile with respect to the shear rate according to the initial temperature profile based on the Cross-WLF model; and setting the first shear viscosity profile as the true shear viscosity profile when a difference between the first temperature profile and the initial temperature profile is not greater than a predetermined threshold.

In some embodiments, the method further includes the operations of: fitting a second shear viscosity profile and a second temperature profile with respect to the shear rate according to the first temperature profile based on the Cross-WLF model when a difference between the first temperature profile and the initial temperature profile is greater than the predetermined threshold; and setting the second shear viscosity profile to be the true shear viscosity profile when a difference between the second temperature profile and the first temperature profile is not greater than the predetermined threshold.

In some embodiments, the method further includes simulating a plurality of flow behaviors of the molding material injecting into a cavity with respect to a plurality of parameter sets according to the true shear viscosity profile.

In some embodiments, the method further includes the operations of: comparing the plurality of flow behaviors to a predetermined flow behavior to select one of the plurality of flow behaviors closest to the predetermined flow behavior; determining one of the plurality of parameter sets corresponding to the selected one of the plurality of flow behavior to be an actual parameter set; and injecting the molding material into the cavity by applying the actual parameter set.

In some embodiments, the operation of obtaining the initial shear viscosity profile at the setpoint temperature with respect to the shear rate of the molding material includes the operations of: obtaining a wall stress; obtaining the shear rate; and obtaining the initial shear viscosity profile by dividing the wall stress by the shear rate.

In some embodiments, the operation of obtaining the initial shear viscosity profile at the setpoint temperature with respect to the shear rate of the molding material further includes the operations of measuring a radius of the capillary; determining a volumetric flow rate of the molding material; measuring a longitudinal length of the capillary; measuring an inlet pressure at an inlet of the capillary; and measuring an outlet pressure at an outlet of the capillary.

In some embodiments, the wall stress is obtained according to the inlet pressure, the outlet pressure, the radius, and the longitudinal length.

In some embodiments, the initial shear rate is obtained according to the volumetric flow rate, the radius, and the wall stress.

In some embodiments, the operation of fitting the initial temperature profile with respect to the shear rate according to the initial shear viscosity based on the Cross-WLF model includes the operations of: measuring a density, a velocity vector, a stress tensor, a specific heat, and a thermal conductivity of the molding material; calculating the initial temperature profile and a capillary temperature profile according to the density, the velocity vector, the stress tensor, the specific heat, the thermal conductivity, and the shear rate; and obtaining the initial temperature profile according to the capillary temperature profile.

In some embodiments, the initial temperature profile is obtained according to a temperature at a predetermined position from an inlet of the capillary of the capillary temperature profile.

In some embodiments, a distance between the predetermined position and the inlet of the capillary is about ⅓ of a longitudinal length of the capillary.

In some embodiments, the operation of fitting the first shear viscosity profile and the first temperature profile with respect to the shear rate according to the initial temperature profile based on the Cross-WLF model includes the operations of: calculating the first temperature profile and updating the capillary temperature profile according to the density, the velocity vector, the stress tensor, the specific heat, the thermal conductivity, and the shear rate; and obtaining the first temperature profile according to the updated capillary temperature profile.

In some embodiments, the first temperature profile is obtained according to a temperature at a predetermined position from an inlet of the capillary of the capillary temperature profile.

In some embodiments, a distance between the predetermined position and the inlet of the capillary is about ⅓ of a longitudinal length of the capillary.

In some embodiments, the first temperature profile is obtained according to an average temperature among the capillary temperature profile.

In some embodiments, the true shear viscosity profile is measured by a rheometer.

Another aspect of the present disclosure provides a molding system. The molding system includes a dispenser and a rheometer. The rheometer is configured to perform the method of measuring a true shear viscosity profile of a molding material in a capillary of the dispenser.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

Figure 1:
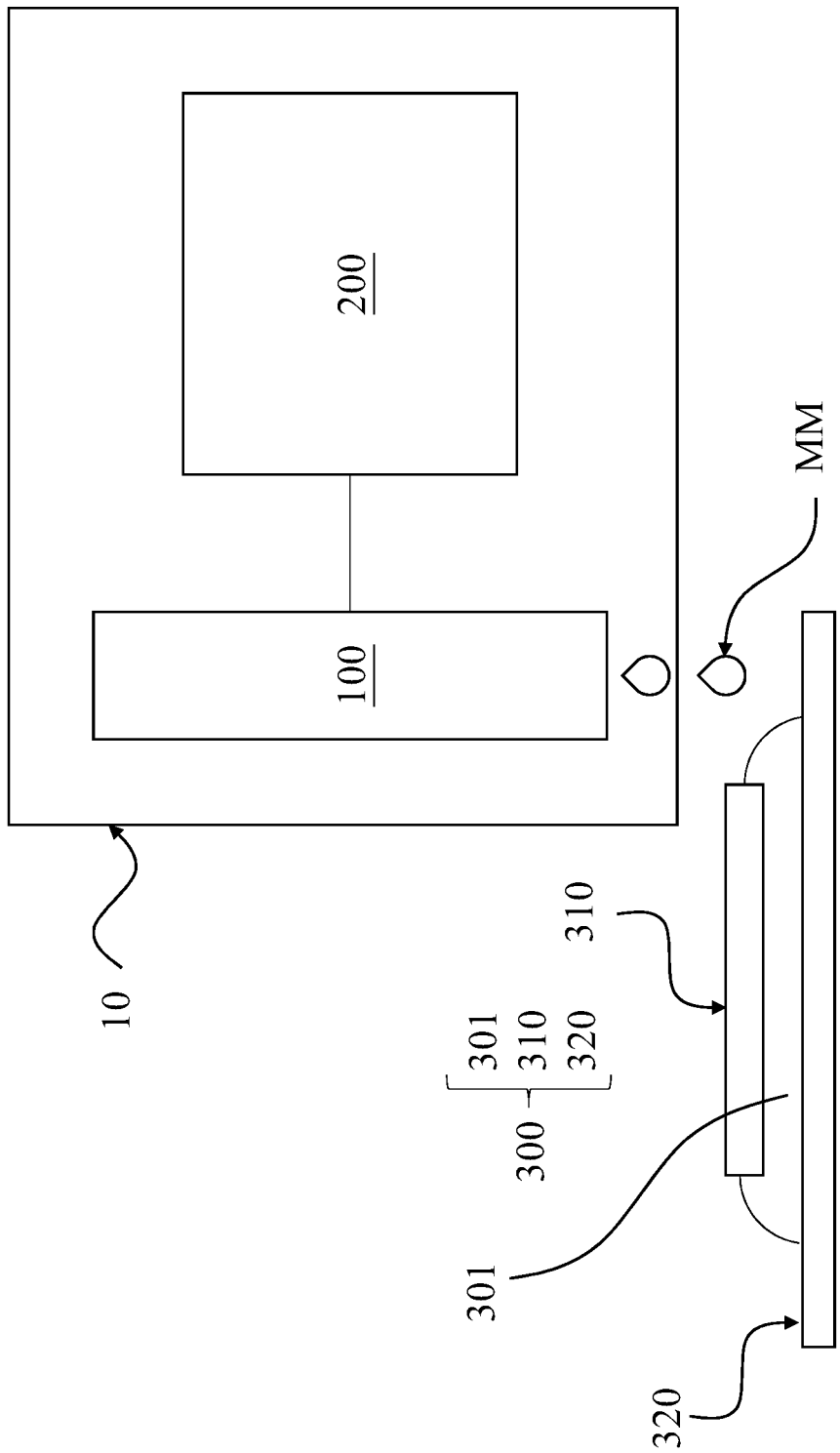
FIG. 1 is a schematic diagram of a molding system according to some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

FIG. 1 is a schematic diagram of a molding system 10 according to some embodiments of the present disclosure. The molding system 10 includes a dispenser 100 and a rheometer 200. The dispenser 100 is configured to dispense a molding material MM into a cavity 301 of a device 300. The rheometer 200 is coupled to the dispenser 100, and configured to measure the behavior of the molding material MM in the dispenser 100.

In some embodiments, the device 300 includes a chip 310 bonded with a substrate 320, and the cavity 301 is formed between the chip 310 and the substrate 320. The molding material MM is configured to encapsulate the cavity 301 so as to protect the chip 310 and the substrate 320. The device 300 is provided for illustration purposes. The present disclosure is not limited thereto. Various devices suitable for being dispensed the molding material MM are within the contemplated scope of the present disclosure.

Figure 2:
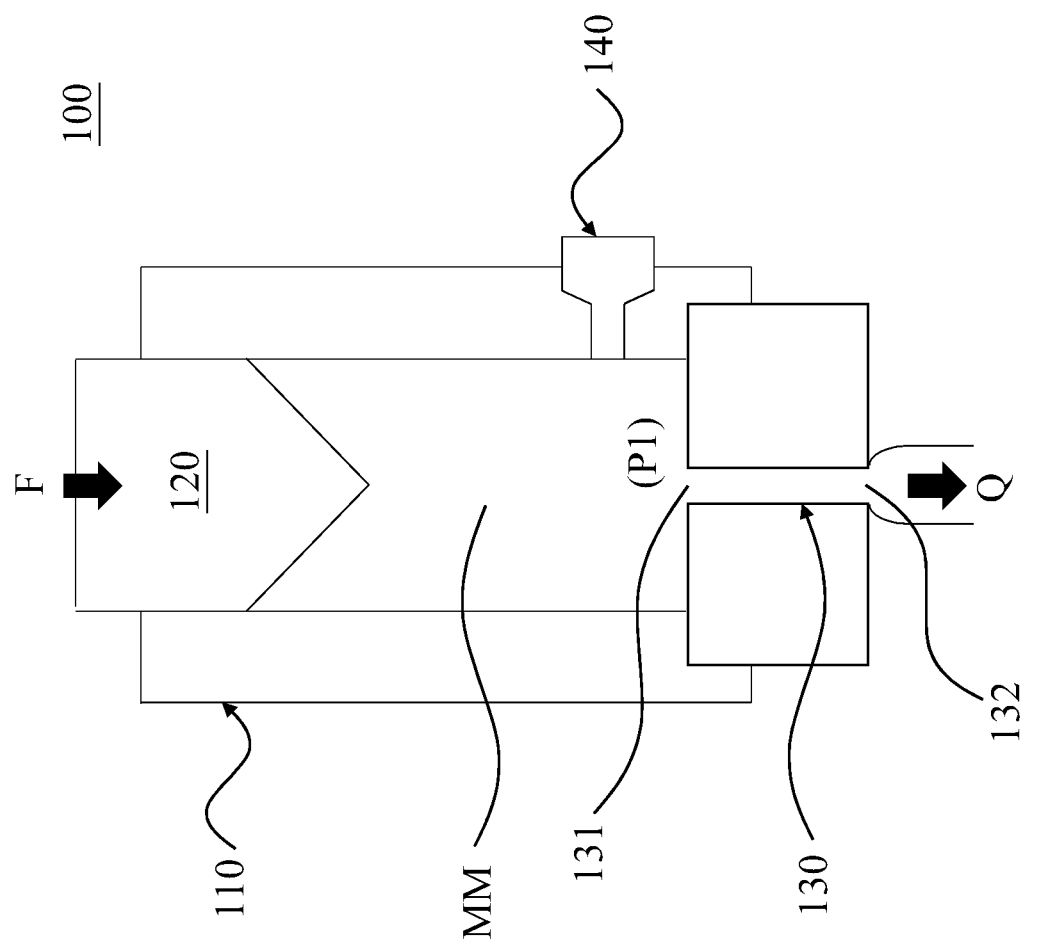
FIG. 2 is a schematic diagram of a dispenser according to some embodiments of the present disclosure.

Reference is made to FIG. 2. FIG. 2 is a schematic diagram of the dispenser 100 according to some embodiments of the present disclosure. The dispenser 100 includes barrel 110, a piston 120, a capillary 130, and a pressure transducer 140.

The barrel 110 has a space therein configured to contain the molding material MM. The capillary 130 is coupled to the barrel 110, and configured to receive the molding material MM from an inlet 131 of the capillary 130 and dispense the molding material MM from an outlet 132 of the capillary 130. The piston 120 is configured to provide a force F to the molding material MM in the space. When the piston 120 is controlled to push the molding material MM in the barrel 110, the molding material MM is pushed toward the inlet 131 of the capillary 130. The molding material MM has a volumetric flow rate Q at the outlet 132 of the capillary 130 according to the force F. In some embodiments, the force F of the piston 120 is controlled by the rheometer 200.

As illustrated in FIG. 2, the pressure transducer 140 is coupled to the barrel 110 close to the inlet 131 of the capillary 130. The pressure transducer 140 is configured to measure a pressure P1 of the molding material MM at the inlet 301 of the capillary 300. In some embodiments, the measured value of the pressure P1 is transmitted to the rheometer 200 for measuring the shear viscosity of the molding material MM.

In some conventional approaches, the injection molding process is performed with simulating the shear viscosity of the molding in which the simulated shear viscosity is independent of the temperature. However, when the melt is transmitted through the capillary, the temperature of the melt increases due to the friction between the melt and the wall of the capillary. In this situation, the melt temperature rise is also referred to as the viscous heating and/or the shear heating. In some embodiments, the shear viscosity is a function of temperature. Therefore, the simulated shear viscosity is not accurate when the temperature changes in the above conventional approaches. Consequently, the result of the injection molding process may not be acceptable.

Compared to the conventional approaches, the present disclosure provides a method of measuring the shear viscosity of the molding material MM. More specifically, the method takes the temperature dependence into account so as to obtain a much accurate flow behavior of the molding material MM in the capillary 130. Please see the details below.

Figure 3:
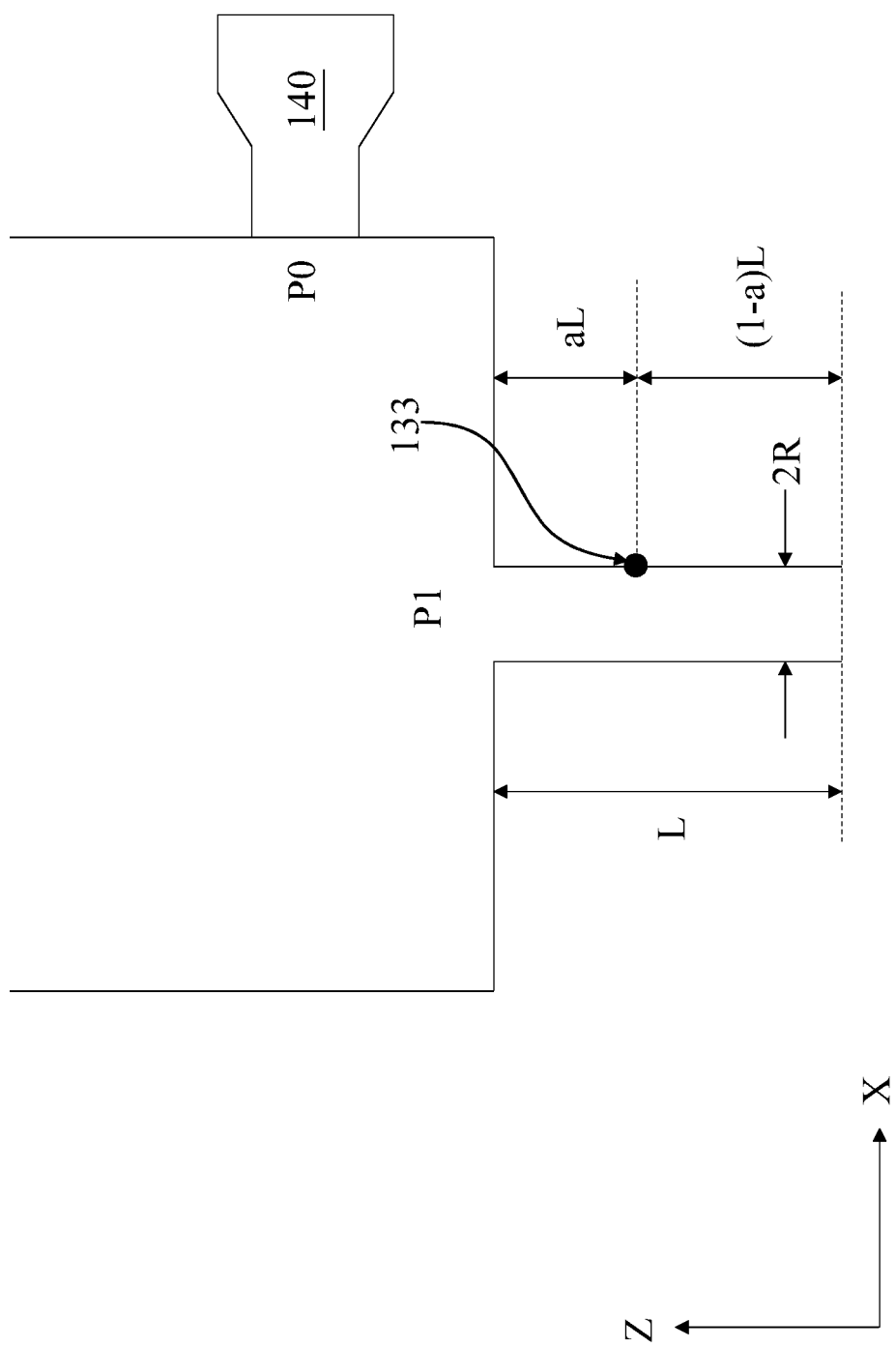
FIG. 3 is a schematic diagram of a portion of the dispenser according to some embodiments of the present disclosure.
Figure 4:
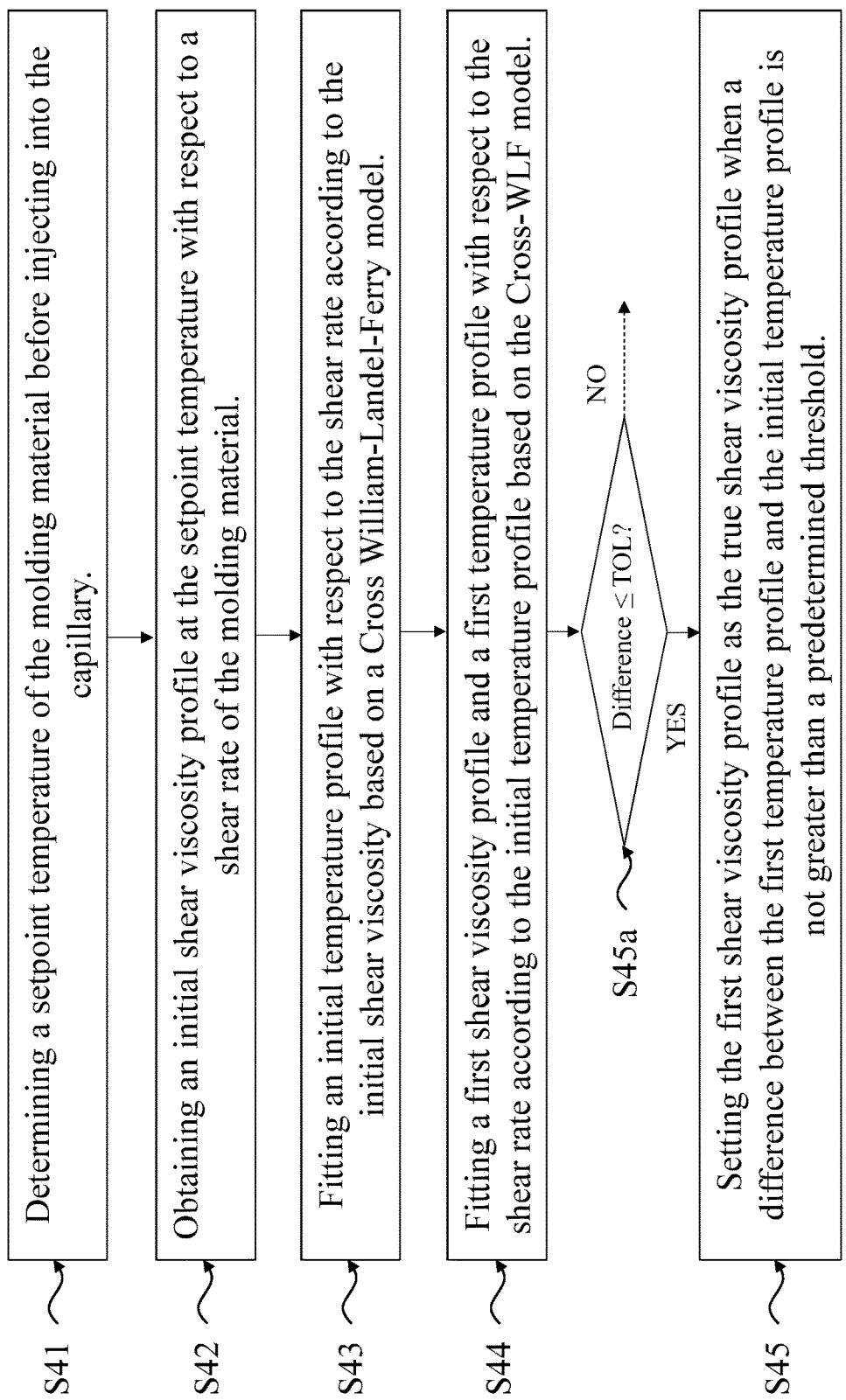
FIG. 4 is a flowchart of a method according to some embodiments of the present disclosure.

Reference is made to FIG. 3 and FIG. 4. FIG. 3 is a schematic diagram of a portion of the dispenser 100 according to some embodiments of the present disclosure. FIG. 4 is a flowchart of a method 40 according to some embodiments of the present disclosure. To facilitate understanding, the method 40 is described with the same reference numerals shown in FIG. 1, FIG. 2, and FIG. 3. The method is configured to measure a true shear viscosity $\eta_{TRUE}(\dot{\gamma})$ of the molding material MM in the capillary 130. In some embodiments, the rheometer 200 is configured to perform the method 40. The method 40 includes operations S41, S42, S43, S44, and S45.

In operation S41, a setpoint temperature Ts of the molding material MM before the molding material MM injected into the capillary 130 is determined. In some embodiments, the setpoint temperature Ts is a temperature of the molding material MM in the barrel 110 before being pushed into the capillary 130. In other words, the molding material MM has the setpoint temperature Ts in the barrel 110. In some embodiments, the setpoint temperature Ts is determined by the rheometer 200.

In operation S42, an initial shear viscosity profile $\eta_0(\dot{\gamma})$ at the setpoint temperature Ts with respect to a shear rate $\dot{\gamma}$ of the moding material MM is obtained. The initial shear viscosity profile $\eta_0(\dot{\gamma})$ is obtained according to a wall stress $\tau_w$ of the molding material MM in the capillary 130 and the shear rate $\dot{\gamma}$. The shear rate $\dot{\gamma}$ used in the operation S42 is independent of the temperature.

Figure 5:
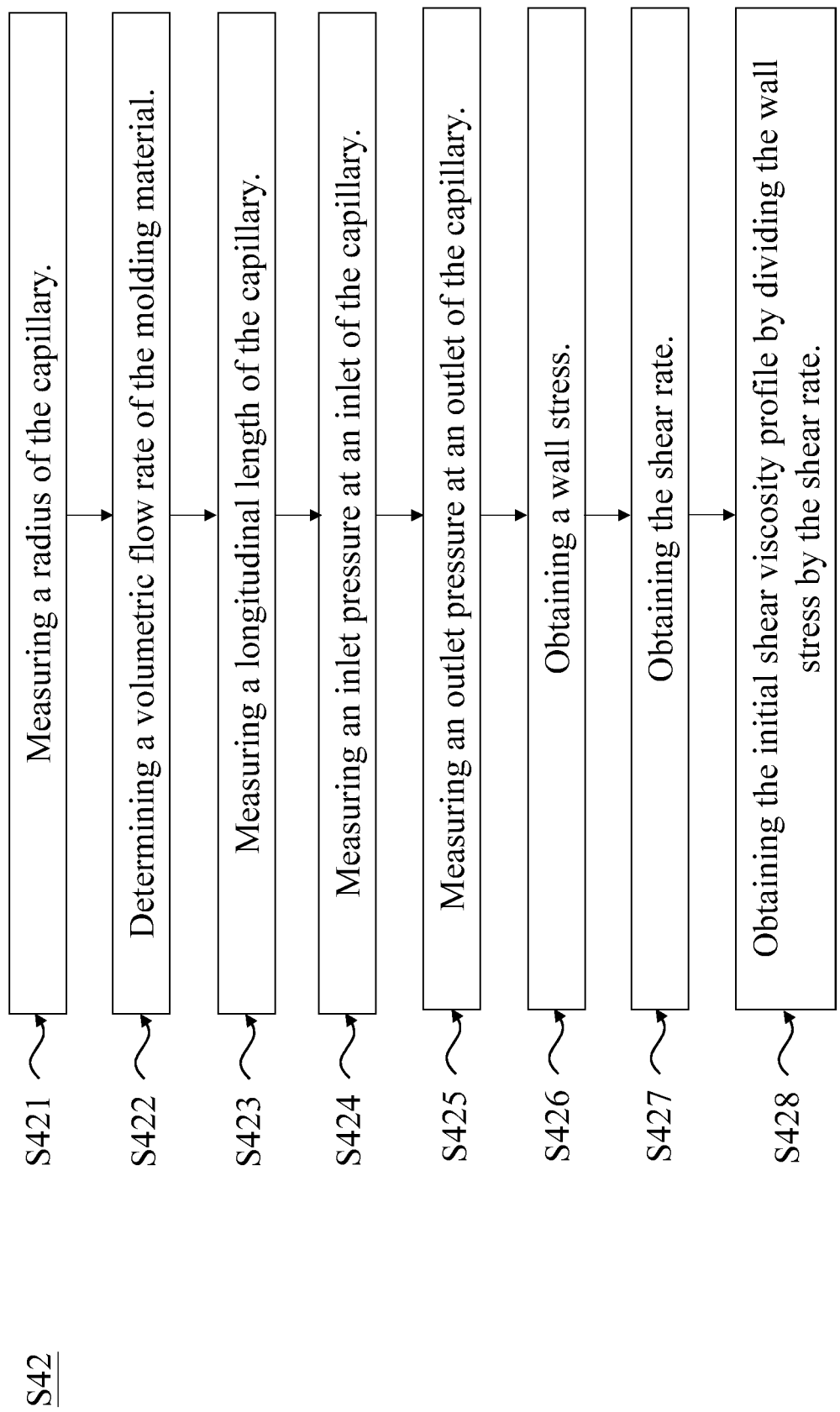
FIG. 5 is a flowchart of an operation of the method shown in FIG. 4 according to some embodiments of the present disclosure.

Please refer to FIG. 5 together. FIG. 5 is a flowchart of the operation S42 of the method 40 according to some embodiments of the present disclosure. The operation S42 includes operations S421, S422, S423, S424, S425, S426, S427, and S428.

In operation S421, a radius R of the capillary 130 is measured.

In operation S422, the volumetric flow rate Q of the molding material MM is determined. In some embodiments, when the force F provided by the piston 120 is determined, a moving speed $v_m$ of the molding material MM can be obtained. The volumetric flow rate Q can be obtained by an equation (1).

$$Q = \pi R^2 v_m \tag{1}$$

In operation S423, a longitudinal length L of the capillary 130 is measured. The longitudinal length is measured from the inlet 131 to the outlet 132.

In operation S424, the pressure P1 at the inlet 131 of the capillary 130 is measured.

In operation S425, a pressure P2 at the outlet 132 of the capillary 130 is measured. In some embodiments, the pressure P2 is the pressure outside of the dispenser 100.

In operation S426, the wall stress $\tau_w$ of the molding material MM is obtained. In some embodiments, the wall stress $\tau_w$ is obtained according to an equation (2).

$$\tau_w = \frac{\Delta P_{cap} \cdot R}{2L} \tag{2}$$

The pressure difference $\Delta P_{cap}$ represents a pressure difference between the pressure P1 and the pressure P2.

In operation S427, the shear rate $\dot{\gamma}$ is obtained. In some embodiments, the shear rate $\dot{\gamma}$ is obtained according to an equation (3). In some embodiments, the equation (3) is also referred to as Weissenberg-Rabinowitsch correction.

$$\dot{\gamma} = \frac{4Q}{\pi R^3}\left[\frac{1}{4}\left(3 + \frac{d\ln\frac{4Q}{\pi R^3}}{d\tau_w}\right)\right] \tag{3}$$

In operation S428, the initial shear viscosity profile $\eta_0(\dot{\gamma})$ is obtained by dividing the wall stress $\tau_w$ by the shear rate $\dot{\gamma}$. The initial shear viscosity profile $\eta_0(\dot{\gamma})$ can be expressed as an equation (4).

$$\eta_0(\dot{\gamma}) = \frac{\tau_w}{\dot{\gamma}} \tag{4}$$

As mentioned above, in order to obtain a more accurate shear viscosity, the temperature dependence is taken into account.

Please refer to FIG. 4 again. In operation S43, an initial temperature profile $T_0(\dot{\gamma})$ is fitted according to the initial shear viscosity profile $\eta_0(\dot{\gamma})$ based on a Cross William-Landel-Ferry (Cross-WLF) model. In some embodiments, the Cross-WLF model can be expressed as the following equations (5) and (6).

$$\eta_0(\dot{\gamma}) = \frac{\eta_r}{1 + (\eta_r \dot{\gamma}/\tau^*)^{1-n}} \tag{5}$$

$$\eta_r = D_1 \exp\left[\frac{-A_1(T - T_r)}{A_2 + (T - T_r)}\right] \tag{6}$$

In the equations (5) and (6), $\eta_r$ is the zero-shear rate viscosity, n is the power-law index, $D_1$ is the viscosity at a reference temperature $T_r$, and $A_1$ and $A_2$ are fitting constants. The shear rate $\dot{\gamma}$ can be obtained when the operation S43 is performed. In Some embodiment, the shear rate $\dot{\gamma}$ is obtained according to the velocity gradient of the molding material MM.

Figure 6:
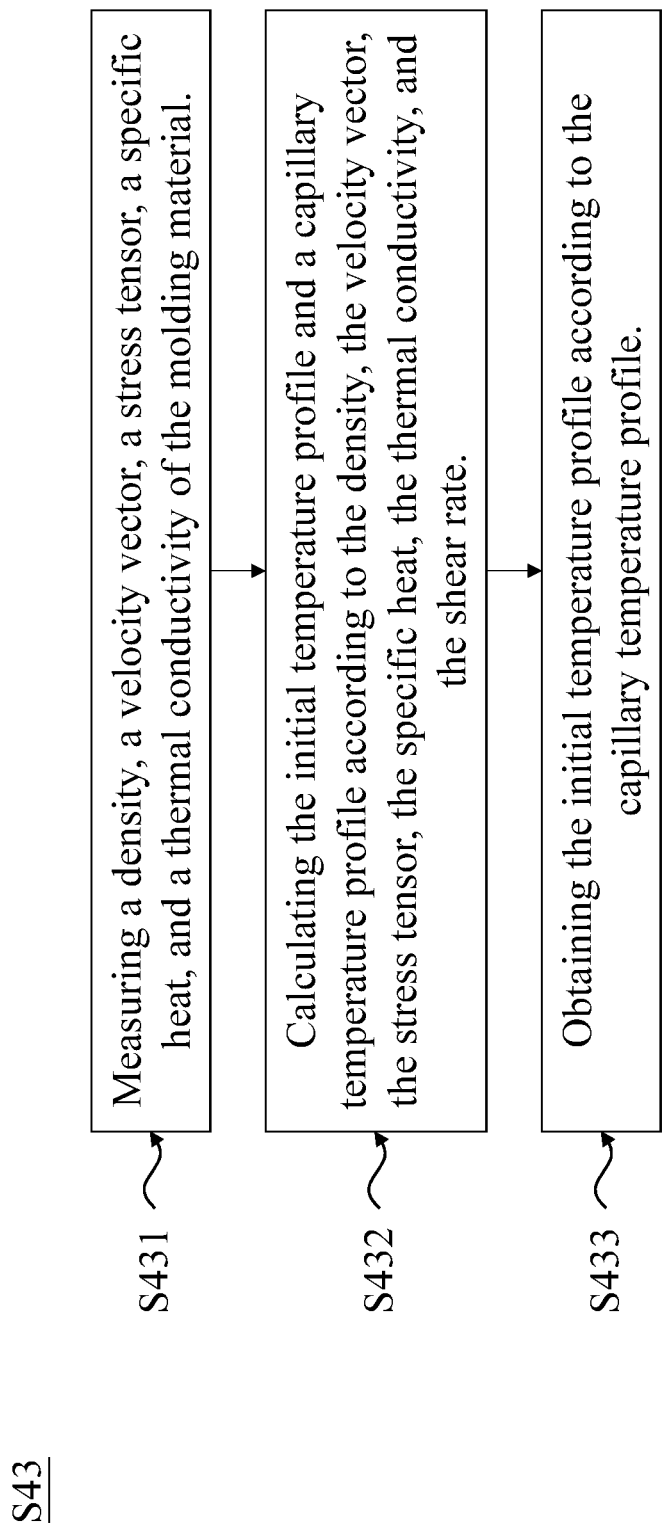
FIG. 6 is a flowchart of an operation of the method shown in FIG. 4 according to some embodiments of the present disclosure.

Please refer to FIG. 6 for details of the operation S43. FIG. 6 is a flowchart of the operation S43 of the method 40 according to some embodiments of the present disclosure. The operation S43 includes operations S431, S432, and S433.

In operation S431, a density $\rho$, a velocity vector $v$, a stress tensor $\tau$, a specific heat $C_p$, and a thermal conductivity $\kappa$ of the molding material MM are measured.

In operation S432, the initial temperature profile $T_0(\dot{\gamma})$ and a capillary temperature profile $T_{cap}(z)$ are calculated according to the density $\rho$, the velocity vector $v$, the stress tensor $\tau$, the specific heat $C_p$, the thermal conductivity $\kappa$, and the shear rate $\dot{\gamma}$.

In some embodiments, the initial temperature profile $T_0(\dot{\gamma})$ and the capillary temperature profile $T_{cap}(z)$ are calculated further according to the governing equation, in which the governing equation has the limitations associated with the following equations (7), (8), (9), and (10).

$$\frac{\partial \rho}{\partial t} + \nabla \cdot \rho v = 0 \qquad (7)$$

$$\frac{\partial}{\partial t}(\rho v) + \nabla \cdot (\rho v v + \tau) = -\nabla p + \rho g \qquad (8)$$

$$\rho C_p \left( \frac{\partial T_{cap}}{\partial t} + v \cdot \nabla T_{cap} \right) = \nabla \cdot (\kappa \nabla T_{cap}) + \eta_0 \dot{\gamma}^2 \qquad (9)$$

$$\tau = -\eta_0 (\nabla v + \nabla v^T) \qquad (10)$$

In the equations (7)-(10), t is time, p is pressure, and g is acceleration vector of gravity.

In operation S433, the initial temperature profile $T_0(\dot{\gamma})$ is obtained according to the capillary temperature profile $T_{cap}(z)$. In some embodiments, the capillary profile $T_{cap}(z)$ is a temperature 1o profile at the wall of the capillary 130 along a Z-axis, and the initial temperature profile $T_0(\dot{\gamma})$ is a temperature profile with respect to the shear rate $\dot{\gamma}$ in the capillary 130 at a predetermined position 133 as shown in FIG. 3. In some embodiments, the predetermined position 133 and the inlet 131 has a distance aL therebetween, and the predetermined position 133 and the outlet 132 has a distance (1−a)L therebetween. In some embodiments, the distance aL is substantially equal to ⅓ of the distance L. In some embodiments, the capillary temperature profile $T_{cap}(z)$ has an average temperature among the capillary temperature profile $T_{cap}(z)$ at the predetermined position 133.

Based on the operations S431-S433, the operation S43 is performed according to the Cross-WLF model rather than the power-law model. However, the present disclosure is not limited thereto. In some embodiments, the operation S43 is performed according to the Carreau model. In some other embodiments, the operation S43 is performed according to the Carreau-Yasuda model, in which the Carreau-Yasuda model is further able to obtain the shear rate $\gamma$ at the second Newtonian plateau. In various embodiments, the operation S43 is performed according to the Herschel-Bulkley model, in which the Herschel-Bulkley model is further able to obtain the yielding behavior of fluids when the shear rate $\dot{\gamma}$ is low. In alternative embodiments, the operation S43 is performed according to the Cross-WLF model, the Carreau model, the Carreau-Yasuda model, the Herschel-Bulkley model, or the combinations thereof.

In addition, because the operation S43 is performed according to the Cross-WLF model, the shear viscosity profile can be obtained over a wider temperature range or a wider shear rate range than some conventional approaches, such as the Arrhenius equation or the Power-law model. The Arrhenius equation is merely valid when the temperature is about 100° C. higher than the glass transition temperature or over a narrow temperature range. The Power-law model is merely valid when the molding material MM is in fast flows.

Furthermore, because the operation S43 is performed according to the Cross-WLF model, the shear viscosity is obtained with respect to the temperature without dividing into different flow regimes. In some conventional approaches, the flow speed is divided into different regimes according to the Cameron number. Therefore, an abrupt temperature change occurs between two adjacent regimes. Compared to the above conventional approaches, the shear viscosity obtained in operation S43 is smooth and more accurately.

Please refer to FIG. 4 again. In operation S44, a first shear viscosity profile $\eta_1(\dot{\gamma})$ and a first temperature profile $T_1(\dot{\gamma})$ are fitted according to the initial temperature profile $T_0(\dot{\gamma})$ based on the Cross-WLF model. The fitting operation in the operation S44 is similar to the fitting operation in the operation S43.

Figure 7:
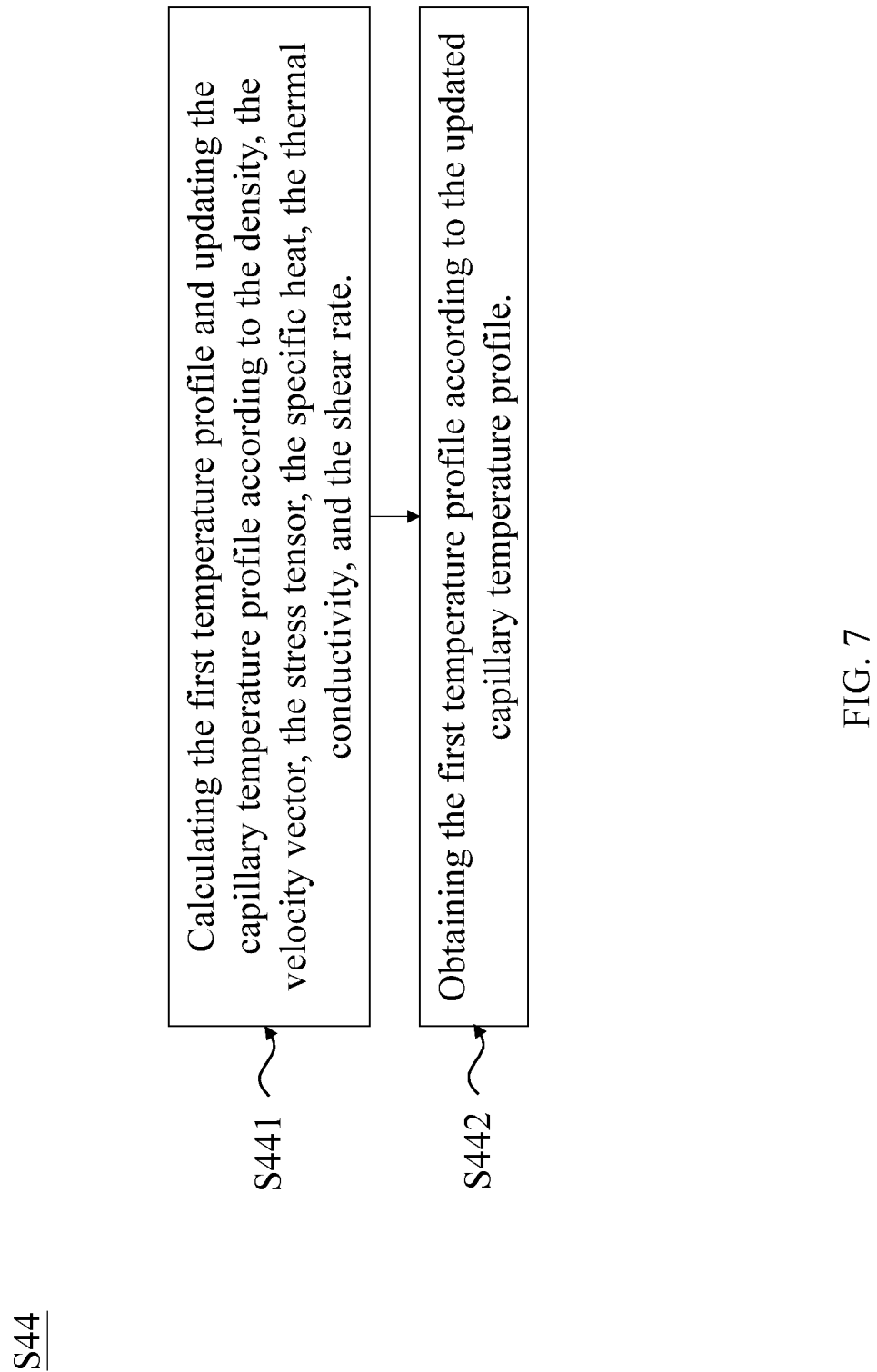
FIG. 7 is a flowchart of an operation of the method shown in FIG. 4 according to some embodiments of the present disclosure.

Please refer to FIG. 7 for details of the operation S44. FIG. 7 is a flowchart of the operation S44 of the method 40 according to some embodiments of the present disclosure. The operation S44 includes operations S441 and S442.

In operation S441, the first temperature profile $T_1(\dot{\gamma})$ is calculated, and the capillary temperature profile $T_{cap}(z)$ is updated. The operation S441 is performed according to the density $\rho$, the velocity vector $v$, the stress tensor $\tau$, the specific heat $C_p$, the thermal conductivity $\kappa$, and the shear rate $\dot{\gamma}$.

Similar to the operation S432, the first temperature profile $T_1(\dot{\gamma})$ and the updated capillary temperature profile $T_{cap}(z)$ are obtained according to the governing equation, and the governing equation has the limitations associated with the equations (7)-(10). More specifically, the initial temperature profile $T_0(\dot{\gamma})$ is replaced by the first temperature profile $T_1(\dot{\gamma})$ to obtain the updated capillary temperature profile $T_{cap}(z)$.

In operation S442, the first temperature profile $T_1(\dot{\gamma})$ is obtained according to the updated capillary temperature profile $T_{cap}(z)$. Similar to the operation S433, the first temperature profile $T_1(\dot{\gamma})$ is a temperature profile at the predetermined position 133 according to the updated capillary temperature profile $T_{cap}(z)$.

Please refer to FIG. 4 again. In operation S45, the first shear viscosity $\eta_1(\dot{\gamma})$ is set as the true shear viscosity profile $\eta_{TRUE}(\dot{\gamma})$ when a difference between the first temperature profile $T_1(\dot{\gamma})$ and the initial temperature profile $T_0(\dot{\gamma})$ is not greater than a predetermined threshold TOL. In other words, the method 40 further includes an operation S45a configured to comparing the difference between the first temperature profile $T_1(\dot{\gamma})$ and the initial temperature profile $T_0(\dot{\gamma})$ to the predetermined threshold TOL, and the operation S45a is performed between the operation S44 and the operation S45. In some embodiments, the predetermined threshold TOL is about 0.1° C.

Figure 8:
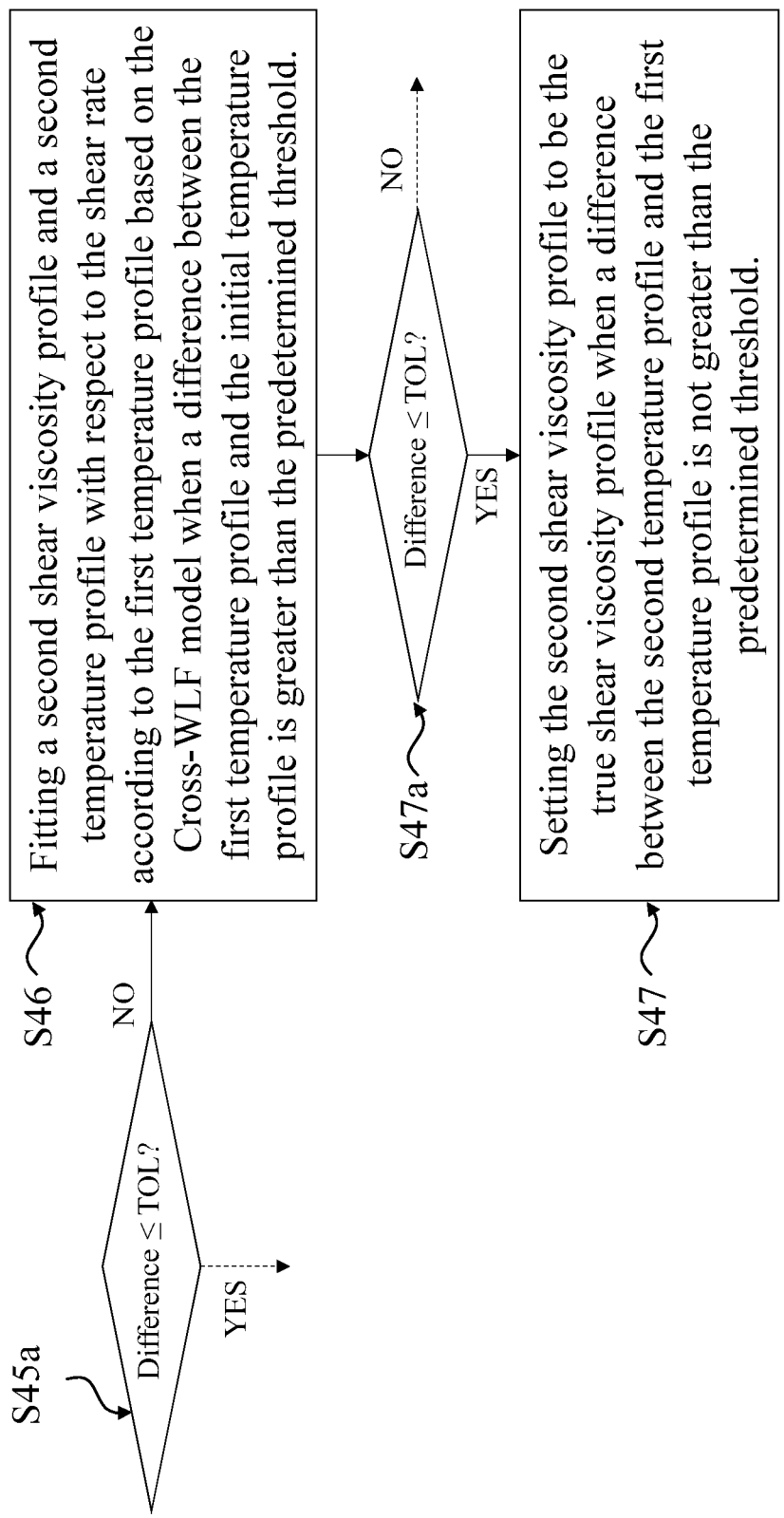
FIG. 8 is a flowchart of the method according to other embodiments of the present disclosure.

Reference is made to FIG. 8. FIG. 8 is a flowchart of the method 40 according to other embodiments of the present disclosure. As illustrated in FIG. 8, the method 40 further includes operations S46 and S47.

In operation S45a, when the difference between the first temperature profile $T_1(\dot{\gamma})$ and the initial temperature profile $T_0(\dot{\gamma})$ is greater than the predetermined threshold TOL, the method 40 proceeds to the operation S46.

In operation S46, a second viscosity profile 72(f) and a second temperature profile $T_2(\dot{\gamma})$ are fitted according to the first temperature profile $T_1(\dot{\gamma})$ based on the Cross-WLF model when the difference between the first temperature profile $T_1(\dot{\gamma})$ and the initial temperature profile $T_0(\dot{\gamma})$ is greater than the predetermined threshold TOL. The operation S46 is similar to the operation S44.

In operation S47, the second viscosity profile $\eta_2(\dot{\gamma})$ is set to be the true viscosity profile $\eta_{TRUE}(\dot{\gamma})$ when the difference between the second temperature profile $T_2(\dot{\gamma})$ and the first temperature profile $T_1(\dot{\gamma})$ is not greater than the predetermined threshold TOL. Similar to the operation S45, the method 40 further includes an operation S47a configured to compare the difference between the second temperature profile $T_2(\dot{\gamma})$ and the first temperature profile $T_1(\dot{\gamma})$ to the predetermined threshold TOL, and the operation S47a is performed between the operation S46 and the operation S47.

Figure 9:
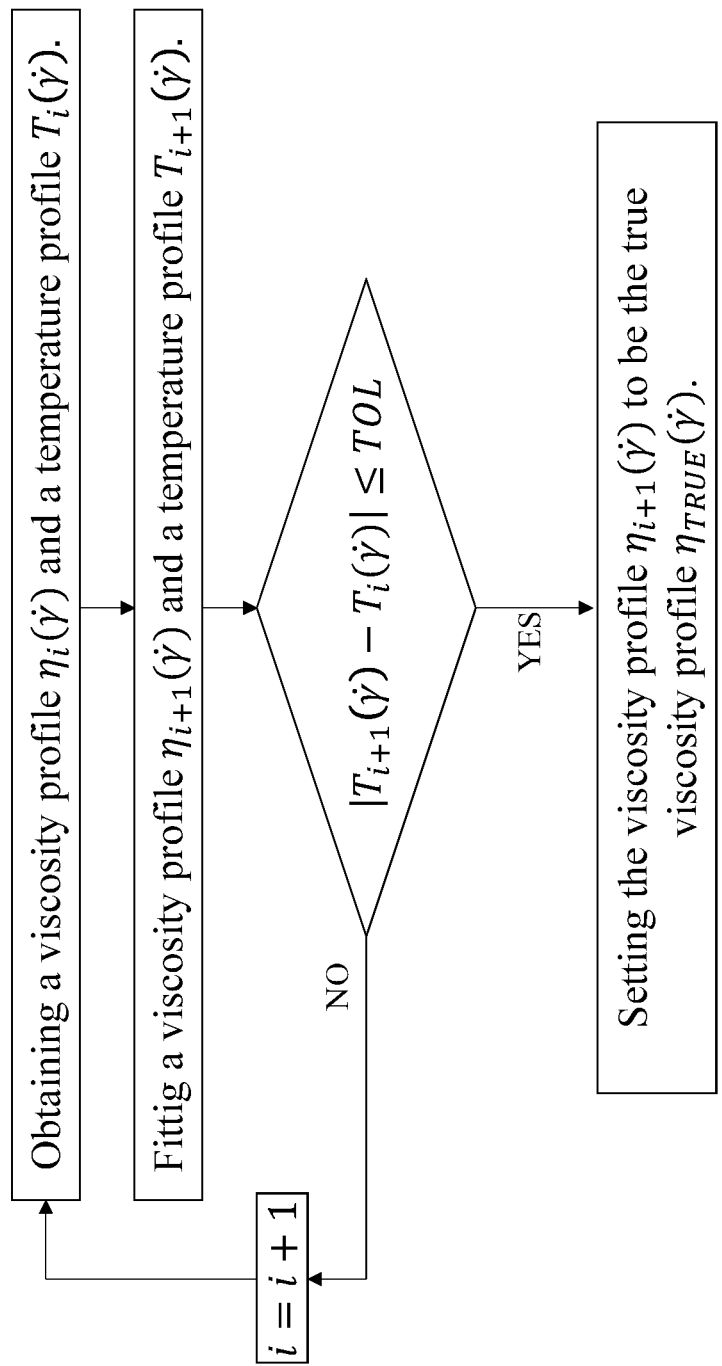
FIG. 9 is a flowchart of the method according to alternative embodiments of the present disclosure.

Based on FIG. 4 to FIG. 8, the method 40 can be rewritten as a flowchart shown in FIG. 9. In FIG. 9, when a viscosity profile $\eta_i(\dot{\gamma})$ and a temperature profile $T_i(\dot{\gamma})$ are obtained, a viscosity profile $\eta_{i+1}(\dot{\gamma})$ and a temperature profile $T_{i+1}(\dot{\gamma})$ are fitted according to the viscosity profile $\eta_i(\dot{\gamma})$ and the temperature profile $T_i(\dot{\gamma})$. Next, the temperature profile $T_{i+1}(\dot{\gamma})$ is compared to the temperature profile $T_i(\dot{\gamma})$ to determine whether the viscosity profile $\eta_{i+1}(\dot{\gamma})$ is accurate enough to be the true viscosity profile $\eta_{TRUE}(\dot{\gamma})$. When the difference between the temperature profile $T_{i+1}(\dot{\gamma})$ and the temperature profile $T_i(\dot{\gamma})$ is not greater than the predetermined threshold TOL, the viscosity profile $\eta_{i+1}(\dot{\gamma})$ is set to be the true viscosity profile $\eta_{TRUE}(\dot{\gamma})$. In contrast, when the difference between the temperature profile $T_{i+1}(\dot{\gamma})$ and the temperature profile $T_i(\dot{\gamma})$ is greater than the predetermined threshold TOL, a next iteration is performed to obtain a viscosity profile $\eta_{i+2}(\dot{\gamma})$ and a temperature profile $T_{i+2}(\dot{\gamma})$.

After the true viscosity profile $\eta_{TRUE}(\dot{\gamma})$ is obtained, the rheometer 200 is able to simulate the flow behaviors of the molding material MM accurately. Moreover, due to the accurate simulations, the performance of the injection molding process can be investigated faster and more accurately. Therefore, the injection molding process can be performed more efficiently.

Figure 10:
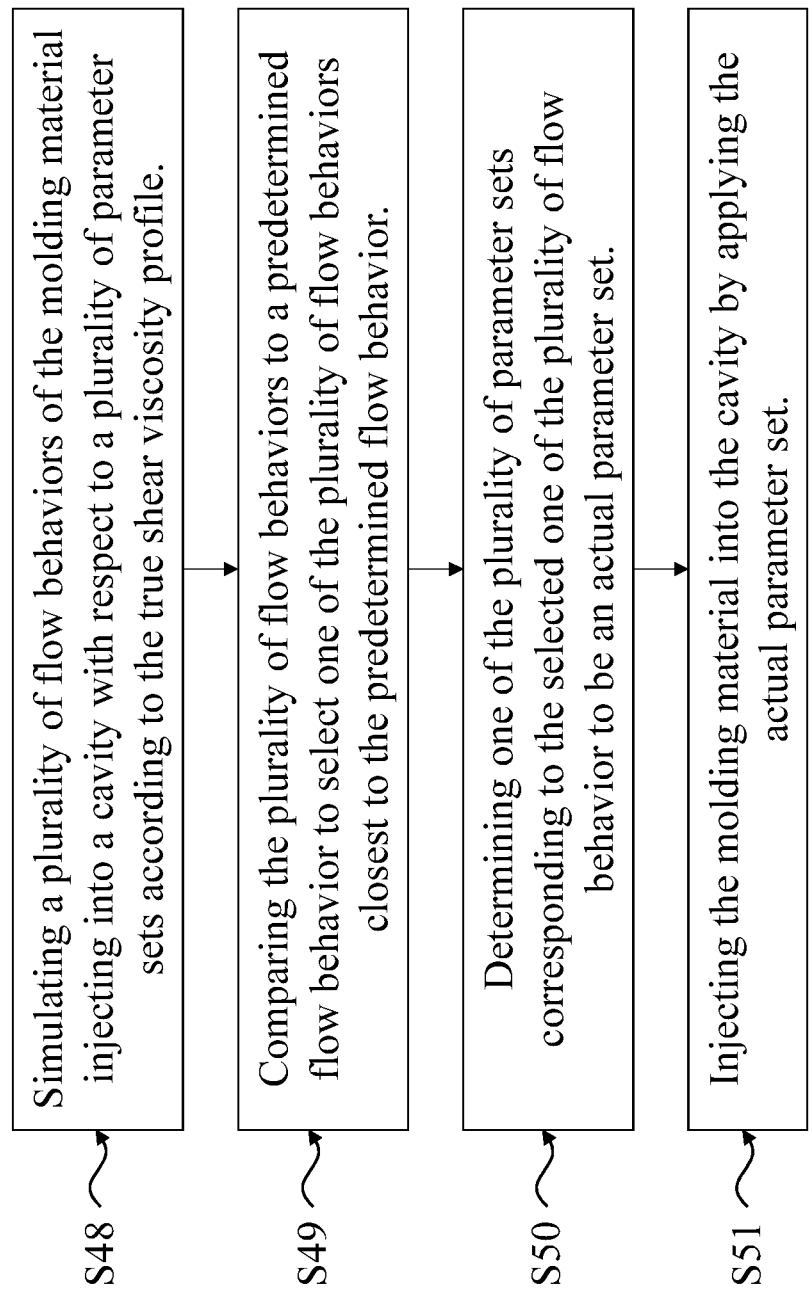
FIG. 10 is a flowchart of the method according to various embodiments of the present disclosure.

Reference is made to FIG. 10. FIG. 10 is a flowchart of the method 40 according to various embodiments of the present disclosure. In various embodiments, the method 40 further includes S48, S49, S50, and S51.

In operation S48, the plurality of behaviors of the molding material MM injected into the cavity 301 with respect to a plurality of parameter sets are simulated according to the true viscosity profile $\eta_{TRUE}(\dot{\gamma})$. The parameters in each parameter set includes the force F, the setpoint temperature Ts, the properties of the molding material MM, and/or the dimension of the capillary 130. However, the present disclosure is not limited thereto, the parameters in each parameter set further includes other suitable parameters in other embodiments.

In operation S49, the plurality of flow behaviors are compared to a predetermined flow behavior to select one of the flow behaviors closest to the predetermined flow behavior.

In operation S50, one of the parameter sets corresponding to the selected one of the flow behaviors is determined to be an actual parameter set.

In operation S51, the molding material MM is injected into the cavity 301 by applying the actual parameter set. The injected molding material MM has a flow behavior as the predetermined flow behavior. Alternatively stated, the measurement of the true shear viscosity profile $\eta_{TRUE}(\dot{\gamma})$ is transformed to an actual injection result on the device 300, in which the measurement improves the efficiency of the injection molding process.

Reference is made to FIG. 3 again. In some embodiments, the rheometer 200 is further configured to build a digital twin model as shown in FIG. 3. The digital twin model has a geometric dimension identical to the dispenser 100. Further, the digital twin model has the true shear viscosity profile $\eta_{TRUE}(\dot{\gamma})$ to estimate the flow behaviors of the molding material MM.

In some embodiments, the pressure transducer 140 is not exactly installed at the inlet 131 of the capillary 130. Therefore, the pressure (denoted as P0) measured by the pressure transducer 140 differs from the pressure P1. Therefore, the pressure difference $\Delta P_{cap}$ becomes (P0–P2), in which the pressure difference $\Delta P_{cap}$ is defined as (P1–P2). According to the equation (2), the wall stress r, is deviated due to the approximation. In order to compensate the deviation, the rheometer 200 is further configured to perform a correction based on Bagley end correction to calculate a pressure difference (P0–P1) so as to obtain the pressure difference (P1–P2).

In various embodiments, the method 40 is able to be applied in a molding system other than the molding system 10 shown in FIG. 1 and FIG. 2. For example, the method 40 can be applied in a molding system having dispenser with a slit die rather than the capillary. However, the present disclosure is not limited thereto. Various configurations of the dispenser in the molding system 10 are within the contemplated scope of the present disclosure.

One aspect of the present disclosure provides a method of measuring a true shear viscosity profile of a molding material in a capillary. The method includes the operations of: determining a setpoint temperature of the molding material before injecting into the capillary; obtaining an initial shear viscosity profile at the setpoint temperature with respect to a shear rate of the molding material; fitting an initial temperature profile with respect to the shear rate according to the initial shear viscosity based on a Cross-WLF model; fitting a first shear viscosity profile and a first temperature profile with respect to the shear rate according to the initial temperature profile based on the Cross-WLF model; and setting the first shear viscosity profile as the true shear viscosity profile when a difference between the first temperature profile and the initial temperature profile is not greater than a predetermined threshold.

Another aspect of the present disclosure provides a molding system. The molding system includes a dispenser and a rheometer. The rheometer is configured to perform the method of measuring a true shear viscosity profile of a molding material in a capillary of the dispenser.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A method of measuring a true shear viscosity profile of a molding material in a capillary, comprising:
   measuring a setpoint temperature of the molding material before injecting into the capillary;
   measuring a temperature at a predetermined position in the capillary, wherein a distance between the predetermined position and an inlet of the capillary is about ⅓ of a longitudinal length of the capillary;
   obtaining an initial shear viscosity profile at the setpoint temperature with respect to a shear rate of the molding material;
   fitting an initial temperature profile with respect to the shear rate according to the initial shear viscosity based on a Cross William-Landel-Ferry (Cross-WLF) model;
   fitting a first shear viscosity profile and a first temperature profile with respect to the shear rate according to the initial temperature profile based on the Cross-WLF model, wherein the initial temperature profile is obtained according to the temperature at the predetermined position in the capillary; and
   setting the first shear viscosity profile as the true shear viscosity profile when a difference between the first temperature profile and the initial temperature profile is not greater than a predetermined threshold, wherein the predetermined threshold is about 0.1° C.

2. The method of claim 1, further comprising:
   fitting a second shear viscosity profile and a second temperature profile with respect to the shear rate according to the first temperature profile based on the Cross-WLF model when a difference between the first temperature profile and the initial temperature profile is greater than the predetermined threshold; and
   setting the second shear viscosity profile to be the true shear viscosity profile when a difference between the second temperature profile and the first temperature profile is not greater than the predetermined threshold.

3. The method of claim 1, further comprising:
   simulating a plurality of flow behaviors of the molding material injecting into a cavity with respect to a plurality of parameter sets according to the true shear viscosity profile.

4. The method of claim 3, further comprising:
   comparing the plurality of flow behaviors to a predetermined flow behavior to select one of the plurality of flow behaviors closest to the predetermined flow behavior;
   determining one of the plurality of parameter sets corresponding to the selected one of the plurality of flow behavior to be an actual parameter set; and
   injecting the molding material into the cavity by applying the actual parameter set.

5. The method of claim 1, wherein obtaining the initial shear viscosity profile at the setpoint temperature with respect to the shear rate of the molding material comprises:
   obtaining a wall stress;
   obtaining the shear rate; and
   obtaining the initial shear viscosity profile by dividing the wall stress by the shear rate.

6. The method of claim 5, wherein obtaining the initial shear viscosity at the setpoint temperature profile with respect to the shear rate of the molding material further comprises:
   measuring a radius of the capillary;
   determining a volumetric flow rate of the molding material;
   measuring the longitudinal length of the capillary;
   measuring an inlet pressure at the inlet of the capillary; and
   measuring an outlet pressure at an outlet of the capillary.

7. The method of claim 6, wherein the wall stress is obtained according to the inlet pressure, the outlet pressure, the radius, and the longitudinal length.

8. The method of claim 6, wherein the initial shear rate is obtained according to the volumetric flow rate, the radius, and the wall stress.

9. The method of claim 1, wherein fitting the initial temperature profile with respect to the shear rate according to the initial shear viscosity based on the Cross-WLF model comprises:
   measuring a density, a velocity vector, a stress tensor, a specific heat, and a thermal conductivity of the molding material;
   calculating the initial temperature profile and a capillary temperature profile according to the density, the velocity vector, the stress tensor, the specific heat, the thermal conductivity, and the shear rate; and
   obtaining the initial temperature profile according to the capillary temperature profile.

10. The method of claim 9, wherein fitting the first shear viscosity profile and the first temperature profile with respect to the shear rate according to the initial temperature profile based on the Cross-WLF model comprises:
    calculating the first temperature profile and updating the capillary temperature profile according to the density, the velocity vector, the stress tensor, the specific heat, the thermal conductivity, and the shear rate; and
    obtaining the first temperature profile according to the updated capillary temperature profile.

11. The method of claim 10, wherein the first temperature profile is obtained according to the temperature at the predetermined position from the inlet of the capillary of the capillary temperature profile.

12. The method of claim 10, wherein the first temperature profile is obtained according to an average temperature among the capillary temperature profile.

13. The method of claim 1, wherein the true shear viscosity profile is measured by a rheometer.

* * * * *